United States Patent [19]

Green

[11] Patent Number: 4,950,854
[45] Date of Patent: Aug. 21, 1990

[54] VACUUM OPERATED CIRCUIT BREAKER APPARATUS FOR REPLACING AIR-MAGNETIC CIRCUIT BREAKER ASSEMBLIES

[75] Inventor: Ian P. Green, Orange, Conn.

[73] Assignee: Electric Services, Inc., East Haven, Conn.

[21] Appl. No.: 429,702

[22] Filed: Oct. 31, 1989

[51] Int. Cl.$^5$ .................. H01H 33/66; H01H 33/42
[52] U.S. Cl. ........................ 200/144 B; 200/50 AA
[58] Field of Search ................ 200/144 B, 50 AA

[56] References Cited

U.S. PATENT DOCUMENTS 3,305,657  2/1967  Roxburgh et al. .............. 200/144 B Primary Examiner—Robert S. Macon
Attorney, Agent, or Firm—McCormick, Paulding & Huber

[57] ABSTRACT

A replacement vacuum operated circuit breaker assembly for voltage distribution switchgear fits into switchgear cubicles that are shaped to accommodate air magnetic circuit breaker assemblies such as the Allis Chalmers 5KV series. The replacement breaker assembly frame configuration and adjustable contact poles allow the replacement assembly to be installed in the original switchgear without expensive modifications to the cubicles.

12 Claims, 2 Drawing Sheets

VACUUM OPERATED CIRCUIT BREAKER APPARATUS FOR REPLACING AIR-MAGNETIC CIRCUIT BREAKER ASSEMBLIES

BACKGROUND OF THE INVENTION

The present invention relates generally to vacuum operated circuit breaker apparatus for replacing air magnetic circuit breaker assemblies. More particularly, the present invention deals with replacement vacuum operated circuit breaker apparatus for air-magnetic circuit breaker assemblies when retrofitting the existing air-magnetic breaker with conventional vacuum operated components is impossible or impractical.

Generally, older voltage distribution systems incorporate switchgear built around air-magnetic (referred to hereinafter as "A-M") circuit breakers. Maintenance on these older distribution systems has become increasingly expensive and time consuming as the systems age. The expense and increased maintenance is largely attributable to the inherent design and construction of all A-M breakers which generally require substantial numbers of new parts to keep the breakers operational as the breakers age.

Metal clad A-M breakers of these older systems specifically designed to be used in 5 kilovolt (KV) switchgear, were manufactured by Allis Chalmers during the late 1940's and early 1950's. These A-M breakers were designed around the criteria of 600, 1200 and 2000 ampere continuous current with various interrupting capabilities ranging from 50 to 250 million volt-amperes (MVA). The Allis Chalmers A-M circuit breaker is designed to be installed horizontally into a cubicle and then racked vertically into an operating position by an elevator. During the middle to late 1950's, Allis Chalmers discontinued manufacturing these A-M circuit breakers and no A-M circuit breakers have been built since that time which are compatible with the vertical lift switchgear. Accordingly, replacement parts for such vertical lift A-M circuit breakers have become increasingly scarce and expensive.

Over the last decade, vacuum operated circuit breakers have generally replaced A-M breakers in new switchgear installations due to the substantial benefits provided. It is well known to those skilled in the art that vacuum circuit breakers are at least ten times more reliable than their A-M counterparts. Furthermore, vacuum technology permits a substantial reduction in circuit breaker size and weight while allowing the breaker to interrupt in two-to-three cycles versus the eight or more cycles required by A-M breakers. Vacuum operated breakers are also far simpler in construction and provide lowered maintenance requirements over the life of the voltage distribution system.

The superior reliability and lower maintenance costs of vacuum operated circuit breakers combined with the scarcity and expense of A-M replacement parts have made it cost effective and desirable to replace A-M breakers with vacuum operated breakers. The expense of installing all new switchgear can be avoided by retrofitting the A-M circuit breakers with vacuum operated components. A-M breaker parts common to both the A-M and vacuum operated circuit breakers are retained while all other parts are replaced by vacuum components.

The A-M circuit breakers are typically housed together in a assembly contained within a frame. For a retrofit to be practical, both the individual A-M breaker and the assembly frame must have a design which permits the installation of vacuum operated components without substantial modifications to the breaker or the frame. Retrofitting the A-M circuit breakers with vacuum operated components has been determined to be less costly than replacement of the entire switchgear. A further advantage is that the older frame and electrical contacts are already configured to fit into the switchgear cubicle. A vacuum retrofitted breaker assembly thus fits easily into the original cubicle. Retrofits for A-M breakers are sometimes available from the original or other manufacturers. However, the configuration of some A-M circuit breakers, such as the Allis Chalmers 5 KV series, make it impossible or impractical to retrofit the individual breakers with vacuum components. Attempts to retrofit the Allis Chalmers A-M breaker have been unsuccessful and when retrofitted unable to provide the required protection, current handling capacity or sensitivity required in the 5 KV power class.

When a retrofit for the A-M breaker is impractical, the only alternative apart from replacing the switchgear is to replace the entire A-M breaker assembly with a vacuum operated breaker assembly. One major drawback is however that the frame and power buses of the replacement vacuum operated breaker assembly must often be configured differently than in the original A-M breaker assembly. The various different configurations require that the switchgear cubicle also be modified in each case so that the replacement assembly can be accommodated for proper operation. Any cubicle modifications add complexity and expense to the retrofit costs in addition to increasing the downtime of the switchgear. Also, as in the case with individual A-M breaker retrofits, it may be impossible or extremely expensive to modify certain cubicles to accept conventional replacement vacuum operated breaker assemblies.

Accordingly, it is a general aim of the present invention to provide a vacuum operated circuit breaker assembly for replacing A-M circuit breaker assemblies in switchgear when retrofitting the individual A-M circuit breakers with vacuum operated components is impractical or impossible.

It is a further aim of the present invention to provide a replacement vacuum operated circuit breaker assembly that may be installed in switchgear cubicles without expensive and time consuming modifications of the cubicle.

SUMMARY OF THE INVENTION

In accordance with the present invention, a vacuum operated replacement circuit breaker for use in switchgear having one or more cubicles originally arranged for operation with air-magnetic circuit breakers is presented. Each of the cubicles has one or more electrical contact pairs disposed in a plane and each of the contact pairs form an open electrical circuit in series with an external power distribution circuit. The replacement circuit breaker includes a vacuum operated circuit breaking means for opening and closing the electrical circuit path and is further carried by a frame, the frame being receivable in one of the cubicles. The replacement breaker also has a number of adjustable electrical connectors for each of the cubicle contact pairs. The connectors are non-conductively secured to the replacement breaker frame and the vacuum operated circuit breaking means is connected in series between the connectors. The connectors adjust in a plane parallel to the contact plane so that when the frame is received into one of the switchgear cubicles, one of the connectors comes into engagement with one of the contact pairs and across the associated open electrical circuit.

The vacuum operated circuit breaker can thus replace the original air magnetic circuit breaker without any expensive modification of the switchgear cubicle. As a result, a customer can enjoy the simpler maintenance, greater reliability and faster response provided by a vacuum operated breaker without having to incur great expense in either replacing the entire switchgear or in trying to retrofit the existing A-M breaker with vacuum operated components.

BRIEF DESCRIPTION OF THE DRAWINGS

Other features and advantages of the present invention will become readily apparent from the following description and drawings wherein.

DETAILED DESCRIPTION OF THE PREFERRED EMBODIMENTS

Figure 1:
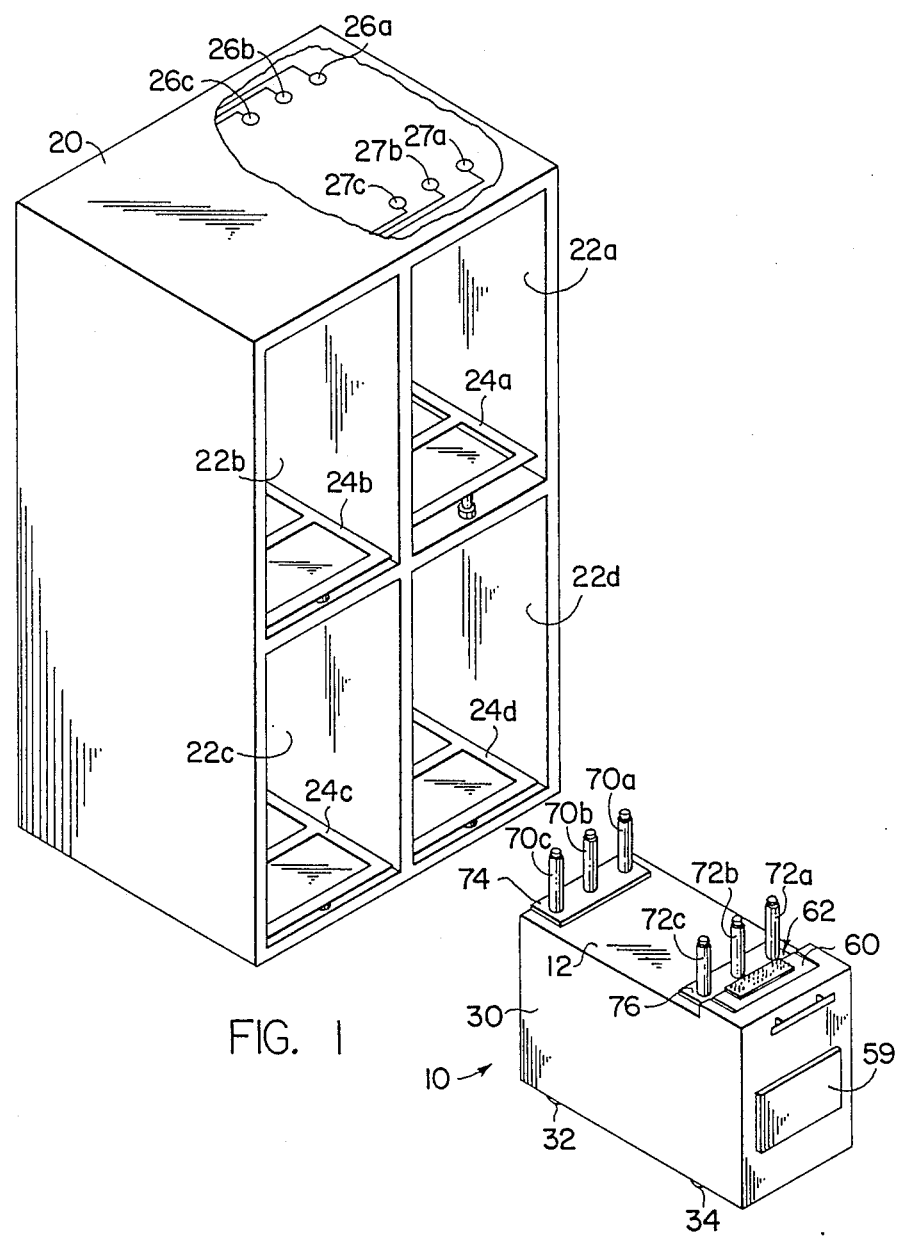
FIG. 1 is a perspective view of the present replacement vacuum operated circuit breaker assembly shown with a switchgear having cubicles arranged so as to accommodate vertical lift air magnetic circuit breakers.

Turning now to the drawings and considering FIG. 1 in particular, the replacement vacuum operated circuit breaker assembly of the present invention is illustrated therein and generally designated 10. The breaker assembly is designed to be used in switchgear 20 which switchgear is part of a voltage distribution system (not shown). Cubicles 22a, 22b, 22c and 22d are shaped to accommodate air magnetic (A-M) circuit breaker assemblies such as the Allis Chalmers 5 KV series. Such 5 KV A-M breaker assemblies are approximately three feet by four feet in size and are used in electric utility power distribution systems and industrial applications. The 5 KV A-M breaker assemblies are intended for horizontal installation into a cubicle such as 22a. Once installed horizontally, the assembly is then racked vertically into operating position by an elevator 24a although such an elevator is not necessary as is known to those skilled in the art. Paired connectors 26a and 27a, 26b and 27b and 26c and 27c extend into the cubicle 22a and each respective connector pair forms an open electrical circuit to an external power circuit connected through the switchgear. The 5 KV A-M breaker assemblies have a single A-M circuit breaker associated with each respective connector pair. Each breaker is then connected in series between a cubicle connector pair and thus into the external power circuit associated with that connector pair. Electrical current flows through the external circuit and the breaker when the breaker is closed and is prevented from flowing when the breaker is open.

Figure 2:
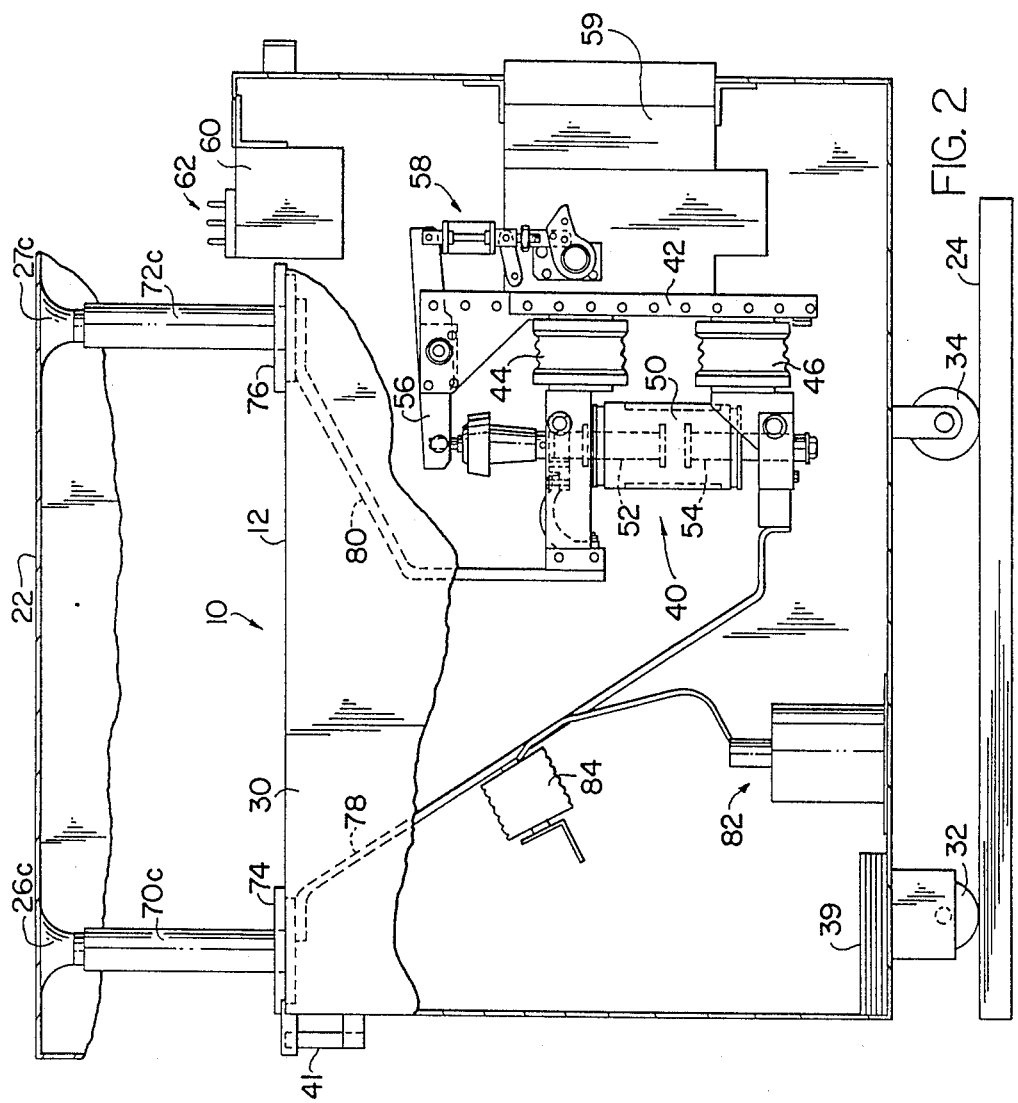
FIG. 2 is a side view of the replacement vacuum operated circuit breaker assembly of FIG. 1 shown installed in the switchgear cubicle of FIG. 1.

Referring now to FIGS. 1 and 2, an embodiment of the present breaker assembly 10 is shown configured to replace an Allis Chalmers 5 KV A-M breaker assembly originally containing three A-M breakers. It should be understood however that the replacement assembly 10 of the present invention can replace A-M breaker assemblies having any number of individual A-M breakers. In the illustrated example, electrical power enters the replacement assembly 10 through six paired adjustable contact poles 70a and 72a, 70b and 72b, and 70c and 72c. The adjustable pole pairs are non-conductively secured to the frame top 12 by pole bracings 74 and 76. Each contact pole 70 or 72 is adjustable individually and infinitely within a range of adjustment in the X-Y plane which plane is generally parallel to the frame top 12 and the horizontal plane of the cubicle 22a into which the assembly is installed. The breaker contact poles 70 and 72 are adjustable to accommodate individual tolerances of the connectors 26 and 27 in each cubicle 22 so that the poles and connectors are in registry thereby eliminating the necessity to modify the cubicle to accept the replacement breaker assembly 10.

The frame 30 is shaped and sized similar to the original Allis Chalmers 5 KV breaker assembly to allow the replacement assembly 10 to both fit into the cubicle 22a and cooperate with the elevator mechanism 24a without need for modifications. It is also desirable to mount the frame 30 on wheels 32, 34, 36 and 38 (wheels 36, 38 not shown) for movement along the floor. The lightest end of frame 30 is ideally counterweighted with plates 39 in order to prevent instability of the replacement assembly 10 when on the cubicle elevator 24a or during rolling movement. An electrical grounding stop 41 on the rear of the assembly 10 engages a complementary grounding bar (not shown in the drawings) at the rear of the cubicle 22a and ensures that the assembly 10 is both correctly aligned and electrically grounded.

One individual vacuum operated circuit breaker is connected between each pair of contact poles 70 and 72. For clarity, only an individual breaker generally designated 40 is shown coupled between the power poles 70c and 72c in FIG. 2. It should be understood that similar vacuum operated circuit breakers are connected in an identical fashion between the respective contact poles 70b and 72b, and 70a and 72a. Support brace 42 secures an individual vacuum operated circuit breaker 40 to the frame 30. A pair of insulating towers 44 and 46 electrically isolate the individual breaker 40 from the frame 30.

The breaker 40 used in the present invention is of the type known as the ASEA Brown Boveri (ABB) 5 KV, 1200 and 2000 amp continuous current, 250 MVA, retrofitting breaker and may be obtained from Brown Boveri. The ABB breaker meets ANSI/IEEE standards and specifications for current breaker design and operation. Use of the ABB breaker incorporates ease of maintenance with ease of operation due to a reduced number of parts and an improved design over a comparable A-M breaker. The ABB vacuum operated breaker allows a substantial reduction in the weight of the entire replacement breaker assembly 10 as compared with the original A-M breaker assembly. The weight reduction diminishes wear on the cubicle elevator mechanism 24a and greatly facilitates the transportation and storage of the replacement breaker assemblies 10.

Referring now to FIG. 2, the vacuum operated breaker 40 is shown in more detail. A vacuum operated breaker 40 such as the ABB is well known to those skilled in the art and typically has a vacuum bottle 50 housing two contacts 52 and 54 arranged for relative movement toward and away from each other. The breaker 40 thus has two operative states, one providing electrical continuity when the contacts 52 and 54 are in closure and a second providing electrical discontinuity when the contacts are moved apart from one another. In the embodiment of FIG. 2, an arm 56 is arranged for pivotal movement and has one end coupled to the contact 52 to reciprocate the contact into and out of engagement with the stationary contact 54. The arm 56 has its opposite end connected to a solenoid assembly 58 which imparts driving motion to the arm. In the present embodiment, solenoid assembly 58 operates with stored energy accumulated after the contacts 52 and 54 are moved into contact with one another. Alternatively, arm 56 may be actuated by a mechanical stored energy system such as a compressed spring which is compressed by a motor or other mechanical means after the contacts 52 and 54 are engaged.

The solenoid assembly 58 and thus the operative state of the individual breaker 40 is controlled by means of a control unit 59. Control unit 59 interacts with remote signal sources through an array 62 of contact pins on secondary coupling 60 (shown in FIG. 1) which provide a connection between the unit and conductors carrying the signals. The secondary coupling 60 also allows the control unit 59 to functionally interlock with a remote unit such as an existing customer control relay so that control over the replacement assembly 10 can be exercised from a remote location without modification of the control signal source. The status of the individual circuit breakers 40 in a cubicle is also provided to remote locations through the secondary coupling 60.

The adjustable pole pair 70c and 72c is connected to an individual breaker 40 via power buses 78 and 80 respectively. Internal components of the replacement breaker assembly 10 including the power bus pair 78 and 80 and all other current carrying components are braced for 250 MVA interruption levels. The individual ABB breaker 40 can thus be safely connected in series between contact poles 70c and 72c.

it is well known to those skilled in the art that high transient voltage spikes can sometimes occur due to the current chopping or re-ignition inherent in voltage systems using vacuum operated circuit breakers. To eliminate these voltage spikes, it is desirable to attach a surge suppression system 82 incorporating a 5 KV standoff 84 to the power bus 78 to bleed off such transient surges when they occur.

The control unit 59 includes a logic circuit and enters a safety state after causing the breaker contacts 52 and 54 to open in response to remote signals applied through the secondary coupling 60. In the safety state, the control unit 59 will not cause the contacts to close until the initial remote signal to close has been applied once, removed and then reapplied, that is, the control unit 59 will not respond to a continuous signal to close. The safety state is desirable for example, because when a remote source such as the original customer control relay detects warning signals and open the breaker contacts 52 and 54, in the trouble condition which caused the warning signals is removed since current no longer flows. It is possible that the remote source would then erroneously conclude that the danger or trouble condition had passed and attempt to cause the contacts 52 and 54 to close. The breaker contacts 52 and 54 are in the present invention, prevented from closing until the second close signal is sent either by manual intervention or by safety modifications to the control relay. Premature closure of the breaker contacts 52 and 54 can result in an undesired and dangerous flow of current through the individual breaker 40. The individual breaker 40 thus operates in one of three states. In the first ON state, the breaker contacts 52 and 54 are closed and current flows through the external circuit. The second state is the safety state in which the contacts 52 and 54 are apart; no current flows through the individual breaker 40 and the control unit 59 will not close the contacts even upon application of a remote signal to close through secondary coupling 60. The third state is an OFF state in which the breaker contacts 52 and 54 are open and one remote close signal has been applied and removed so that the next remote close signal applied will result in closure of the breaker contacts 52 and 54.

Referring again to FIG. 2, the replacement vacuum operated breaker 10 can be installed in a switchgear cubicle 22a in the same manner as the original A-M breaker. Since the frame 30 is based on the original A-M breaker frame, the replacement breaker can be racked vertically into operating position by the elevator 24a. The infinitely adjustable contact poles 70 and 72 allow the individual vacuum operated breakers 40 to connect one-for-one to the paired cubicle connectors 26 and 27 without any expensive modifications to the cubicle.

As noted above, it is impractical and difficult to retrofit an individual Allis Chalmers A-M circuit breaker with vacuum components. The alternative replacement vacuum operated circuit breaker 10 of the present invention allows vacuum technology to be directly interchanged with existing A-M breakers now in use. Use of the present replacement breakers 10 allows the continued use of the original switchgear and A-M breaker cubicles while deriving the benefits offered by vacuum operated breakers. These benefits include lower maintenance costs, greater reliability and faster response time to trouble conditions. Customers therefore save the large expense of purchasing completely new vacuum technology switchgear or effectuating expensive modifications to the original switchgear cubicles 22 to accommodate known replacement vacuum operated breaker assemblies when such replacement assemblies are available.

A replacement vacuum operated circuit breaker assembly for air magnetic circuit breaker assemblies has been described above. It will be understood that numerous modifications and substitutions may be made without departing from the spirit of the invention. For instance, any number of individual vacuum operated breakers can be incorporated within the replacement breaker assembly. Also, the replacement breaker assembly can be used in switchgear cubicles without elevator mechanisms. Therefore, the invention has been described by way of illustration rather than limitation.

I claim:

1. A replacement power protection circuit breaker assembly for use in a switchgear having a cubicle, said cubicle having an interior enclosed by a top wall, a bottom wall, a first side wall and a second side wall, said top and bottom walls being in a spaced apart and generally parallel relationship, said first and second side walls being in a spaced apart and generally parallel relationship and also being generally perpendicular to and intersecting with said top and bottom walls, said cubicle having at least one pair of connectors extending through said top wall and into the interior of said cubicle, each of said at least one connector pairs forming an open electrical circuit to an associated external power circuit, said replacement circuit breaker assembly comprising, means defining a frame, said frame having a size and shape and being arranged for insertion into the interior of said cubicle;

at least one vacuum operated circuit breaking means defining electrical contact means for providing an electrical circuit path to carry electrical current, each of said circuit breaking means having a first operative state wherein said contact means provide a discontinuous circuit path and a second operative state wherein said contact means provide a continuous circuit path;

control means for causing a selected one of said at least one vacuum operated circuit breaking means to switch from one of said first and second operative states to the other of said first and second operative states, and means defining at least one pair of contact poles, each of said contact poles being non-conductively secured to said frame and projecting generally towards said cubicle top wall when said assembly is in orientation for insertion into said cubicle, each of said contact poles being generally adjustable along a plane generally defined parallel with said cubicle top wall for mechanical and electrical engagement with a respective cubicle connector, each of said at least one pair of contact poles being electrically coupled in series with a respective one of said at least one vacuum operated circuit breaking means whereby each of said at least one circuit breaking means is connected in electrical series with a respective one of said at least one connector pairs and across said associated external open circuit to provide a continuous electrical path for current to flow in said associated external electrical circuit when said breaking means is in said first operative state and to provide a discontinuous circuit path to stop current from flowing when said breaking means is in said second operative state.

2. The replacement circuit breaker of claim 1 further including secondary coupling means for coupling a remote signalling device to said control means.

3. The replacement circuit breaker of claim 2 wherein said control means provides a status signal to said remote device, said status signal defining said first and second operative states of each of said at least one vacuum operated circuit breaking means.

4. The replacement circuit breaker of claim 2 wherein said control means is responsive to electrical control signals generated by said remote device.

5. The replacement circuit breaker of claim 4 wherein said control means includes logic circuit means for not responding to a signal from said remote device to switch from said first operative state to said second operative state unless said signals from said remote device follow the sequence of being present, then absent and then present.

6. The replacement circuit breaker of claim 1 further characterized in that each of said at least one vacuum operated circuit breaking means includes two electrical contacts, at least one of said two electrical contacts being moveable into and out of closure with the other of said two electrical contacts so that said vacuum operated circuit breaking means is in said first operative state when said two electrical contacts are not in closure and said circuit breaking means is in said second operative state when said two electrical contacts are in closure.

7. The replacement circuit breaker of claim 6 further including actuating means to move said at least one moveable electrical contact out of closure with the other electrical contact, the moving force exerted by said actuating means on said at least one moveable contact being derived from power accumulated during the time said two electrical contacts are in closure.

8. The replacement circuit breaker of claim 7 wherein said actuating means includes a solenoid.

9. The replacement circuit breaker of claim 7 wherein said actuating means includes a compressible spring.

10. The replacement circuit breaker of claim 1 further including voltage surge suppressor means associated with each of said at least one vacuum operated circuit breaking means to bleed off transient voltage spikes occurring within said associated external power circuit.

11. The replacement circuit breaker of claim 1 further characterized in that said frame has a size and shape generally resembling the size and shape of an Allis Chalmers 5 KV class air-magnetic circuit breaker.

12. The replacement circuit breaker of claim 11 wherein said switchgear cubicle further includes elevator means to raise said replacement breaker assembly into an operating position after said replacement assembly is received by said cubicle interior.

* * * * *